the 
United States Patent [19]

Scott

[11] 4,138,327
[45] Feb. 6, 1979

[54] VAPOR/LIQUID DISTRIBUTOR FOR FIXED-BED CATALYTIC REACTION CHAMBERS

[75] Inventor: Norman H. Scott, Arlington Heights, Ill.

[73] Assignee: UOP Inc., Des Plaines, Ill.

[21] Appl. No.: 848,700

[22] Filed: Nov. 4, 1977

[51] Int. Cl.² .................. C10G 13/00; C10G 23/06
[52] U.S. Cl. .............................. 208/146; 422/224; 422/220; 208/49
[58] Field of Search ............. 208/146, 49; 23/288 R

[56] References Cited

U.S. PATENT DOCUMENTS

| 2,327,045 | 8/1943 | Huff | 23/288 R |
| 2,762,683 | 9/1956 | Massey | 208/146 |
| 3,378,349 | 4/1968 | Shirk | 23/288 R |
| 3,824,081 | 7/1974 | Smith et al. | 208/146 |

Primary Examiner—Herbert Levine
Attorney, Agent, or Firm—James R. Hoatson, Jr.; Robert W. Erickson; William H. Page, II

[57] ABSTRACT

A method and distributor device for effecting the uniform distribution of a mixed-phase vapor/liquid reactant stream across the upper surface of a fixed-bed of catalyst particles. Mixed-phase reactants or components are first separated into a principally vapor-phase and a principally liquid-phase. These separated phases are then re-mixed in a manner which creates a vapor/liquid froth; the latter being re-distributed to the upper surface of the bed of catalyst particles. Briefly, the distributor comprises three annular-form, catalyst-free volumes which are defined by the interior surface of said chamber and three cylindrical walls in concentric relationship therewith.

5 Claims, 6 Drawing Figures

VAPOR/LIQUID DISTRIBUTOR FOR FIXED-BED CATALYTIC REACTION CHAMBERS

APPLICABILITY OF INVENTION

The method for effecting uniform distribution of a mixed-phase reactant stream to a fixed-bed of catalyst particles and the distributor apparatus therefor, encompassed by my inventive concept, are intended to be applied to processes widely practiced within the petrochemical and petroleum industries. Furthermore, the present invention is specifically directed toward the distribution of a mixed vapor/liquid phase to a fixed-bed of catalyst particles disposed within a catalytic reaction chamber. As such, it is well-suited for use (1) to distribute the reactant stream as it initially enters the reaction chamber and, (2) to distribute the mixed-phase effluent from one distinct bed of catalyst particles into the next succeeding lower bed of catalyst particles. Essentially, it is intended to utilize the present technique and apparatus in those catalytic reaction systems in which the vapor/liquid reactant stream flows cocurrently and downwardly. Similarly, it may be employed to distribute two heterogeneous liquids.

Although mixed-phase reactions are found in both petroleum refining and petrochemical processes, they appear to be more prevalent in the former; therefore, the following discussion will be limited to catalyzed hydrocarbon conversion reactions without, however, the intent to unduly restrict the broad scope of the invention herein described. Mixed-phase hydrocarbon conversion reactions are generally effected in those processes where the fresh feed charge stock predominates in hydrocarbons boiling above the naphtha boiling range—i.e. above a temperature of about 400° F. In many cases, the vapor/liquid reactant stream consists of liquid hydrocarbon constituents and a vapor phase which is concentrated in hydrogen. Charge stocks include kerosene fractions, light and heavy gas oils (both atmospheric and vacuum) and asphaltenic black oils containing constituents boiling above about 1050° F. Obviously, my invention does not rely for viability upon a particular hydrocarbonaceous charge stock, nor upon the particular reaction, or reactions being effected. The latter include hydrocracking, hydrogenation, desulfurization, denitrogenation, hydrotreating and combinations thereof, all of which are hydrogen-consuming and, therefore, principally exothermic in nature.

Paramount to successfully effecting hydrogen-consuming reactions in mixed-phase processing is the uniform distribution of the reactant stream to the fixed-bed of catalyst particles. Where a given reaction chamber contains more than one distinct bed of catalyst particles, uniform distribution of the reactant stream from a preceding bed to a succeeding bed must also be effected. Tantamount to hydrogen-consuming reactions is the continuous intimate contact of hydrogen with the hydrocarbonaceous reactants, not only at the initial portion of the catalyst bed, but also throughout the same as the reactant stream flows downwardly therethrough. The tendency for liquid and vapor constituents to segregate and seek separate paths while traversing the bed of catalyst particles is commonly known and referred to as "channelling". As hereinafter indicated, the detrimental effects of channelling are well known and a multiplicity of devices have been provided in attempts to alleviate the same.

The technique and apparatus herein described is also directed toward uniform distribution of a mixed-phase reactant stream to a fixed-bed of catalyst particles; however, provision is made to provide for continued intimate vapor/liquid contact as the reactant stream traverses the catalyst bed. Briefly, the technique involves three distinct operations effected in an apparatus having three individually distinct zones. The mixed-phase reactant stream, whether initially introduced into the reaction chamber, or emanating from one catalyst bed for introduction into a succeeding catalyst bed, is first separated into a substantially liquid-free vapor-phase and a substantially vapor-free liquid-phase. These are subsequently re-mixed in a fashion which creates a vapor/liquid froth, or foam-like mixture; this froth is re-distributed to the bed of catalyst particles. The use of the term "froth" in the present specification and appended claims is intended to allude to a semi-stable, intimate dispersion of a liquid in a vapor phase. The liquid takes the form of extremely fine droplets which are dispersed in a continuous vapor phase which gradually collapses as the froth traverses the bed of catalyst particles.

OBJECTS AND EMBODIMENTS

A principal object of my invention is to provide uniform distribution of a mixed-phase vapor/liquid reactant stream to a fixed-bed of catalyst particles. A corollary objective is to afford a technique which produces a decrease in the vapor/liquid "channelling" effect as the reactant stream traverses the bed of catalyst particles.

A specific object of the invention as herein described is to provide a vapor/liquid distributor device which can initially distribute the reactant feed stream to the uppermost catalyst bed, or function intermediate two catalyst beds to distribute the mixed-phase effluent from an upper catalyst bed uniformly to the next succeeding lower catalyst bed.

Still another object is directed toward uniform introduction of a vapor/liquid mixed-phase, to a bed of catalyst particles, in a form which possesses the capability of resisting segregation and subsequent channelling as it traverses the catalyst bed.

Therefore, in one embodiment, my invention is directed toward a cocurrent, mixed-phase catalytic reaction system wherein a vapor/liquid reactant stream flows downwardly through a fixed-bed of catalyst particles, and encompasses the method for effecting the uniform distribution of said reactant stream, which method comprises the sequential steps of: (a) introducing said vapor/liquid reactant stream into a first catalyst-free area within said reaction system, and therein separating said stream into (i) an upwardly-flowing, substantially liquid-free vapor phase and, (ii) a downwardly-flowing, substantially vapor-free liquid phase; (b) reversing the flow of said separated liquid phase and forming a quasi-stagnant pool thereof; (c) reversing the flow of the separated vapor phase and introducing said vapor phase into a lower second catalyst-free area, within said reaction system, disposed below said quasi-stagnant liquid pool; (d) passing said vapor phase upwardly through said liquid pool and creating a vapor/liquid froth therewith; and, (e) distributing said vapor/liquid froth downwardly into a bed of catalyst particles, disposed below said quasi-stagnant liquid pool, and across substantially the entire upper surface thereof.

This embodiment is further characterized in that the mixed-phase reactant stream is passed into said first catalyst-free area when it is initially introduced into the catalytic reaction system. Further, it may be passed into the first catalyst-free area as the effluent from an upper, preceding fixed-bed of catalyst particles.

In another embodiment, the invention herein described involves a vapor/liquid distributor for effecting uniform distribution of a mixed-phase reactant stream to the upper surface of a fixed-bed of catalyst particles disposed within a catalytic reaction chamber, said distributor having three annular-form catalyst-free volumes defined by the interior surfaces of said chamber and three cylindrical walls in concentric relationship therewith, and comprising, in cooperative relationship: (a) a first cylindrical wall having (i) a greater nominal diameter and height than second and third cylindrical walls and, (ii) a perforated first horizontal plate attached to the entire lower periphery thereof, said first cylindrical wall defining an outer first annular-form volume with the interior surface of said reaction chamber; (b) a second cylindrical wall having (i) a greater nominal diameter than the third of said cylindrical walls and, (ii) an imperforate second horizontal plate attached to the entire upper periphery thereof, and being disposed intermediate the upper and lower periphery of said first cylindrical wall and defining an intermediate second annular-form volume therewith; (c) a third cylindrical wall disposed a finite distance below said imperforate second horizontal plate and having its entire lower periphery attached to said perforated first horizontal plate, said third cylindrical wall defining an inner third annular-form volume with said second cylindrical wall; and, (d) a third horizontal plate, attached at its outer periphery to the interior surface of said chamber, and having a plurality of vertical tubular conduits attached to its upper surface, said tubular conduits (i) extending upwardly through said perforated first horizontal plate and within said third cylindrical wall, and terminating a finite distance below said imperforated second horizontal plate, and, (ii) having a nominal diameter greater than the remaining apertures in said perforated first horizontal plate.

This embodiment may be further characterized in that the portion of the first horizontal plate between the first and third cylindrical walls is imperforate. Other objects and embodiments of the present invention will become evident from the following more detailed description thereof. In one such other embodiment, an imperforate horizontal washer-shaped disc is disposed above the upper periphery of said first cylindrical wall, and (i) is attached to the interior surface of the catalytic reaction chamber and, (ii) extends inwardly over said first and second catalyst-free volumes.

CITATION OF RELEVANT PRIOR ART

It must be recognized and acknowledged that the prior art abounds with a wide variety of devices to introduce (1) a mixed-phase reactant stream into a catalytic reaction zone, (2) a vapor and/or liquid quench stream at an intermediate locus within a fixed-bed of catalyst particles and, (3) the mixed-phase effluent from an upper catalyst bed into the next succeeding lower catalyst bed. A perusal of the appropriate Classes 23-288 and 208-146 indicates that this is the case.

For example, U.S. Pat. No. 2,981,677 (Cl. 208-146), issued Apr. 25, 1961, is illustrative of a tri-conversion zone reaction chamber for utilization in a countercurrently-conducted catalytic process; liquid flows serially in a downwardly direction while the vaporous reactant flows upwardly. In essence, the apparatus consists of a horizontal plate containing a plurality of vapor risers, in the form of bubble caps, through which liquid reactant flows downwardly; the plate supports the catalyst bed into which the risers extend. A second horizontal plate is disposed a finite distance above the catalyst bed, and contains a plurality of liquid downcomers through which liquid flows downwardly into the lower catalyst bed. The void volume between the catalyst bed and the second horizontal plate is referred to as a disengaging space; however, not all the vaporous material is separated therein. That is, a quantity thereof flows upwardly through the liquid downcomers in the horizontal plate. Details of this operation, shown graphically in FIG. 1 as conversion zone "A", are given in Column 3, Lines 31-47 (downwardly-flowing liquid) and in Column 4, Line 60 through Column 5, Line 17 (upwardly-flowing vaporous constituents). The apparatus further makes provision for a liquid quench (conduits 48, 50 and 52 in FIG. 1) as described in Column 5, Lines 45-56. Initially, it must be noted that the apparatus is peculiar to countercurrent flow of gaseous and liquid constituents. This, however, is not the most distinguishing feature with respect to the vapor/liquid mixed-phase distributor claimed and described herein. Most noteworthy is the fact that the apparatus of the reference makes no provision for a re-mixing of the separated liquid and vapor streams to create a froth for re-distribution to the next succeeding catalyst bed. Indeed, not only is it incapable of creating such a froth, to do so would effectively destroy its intended function. Further, the apparatus does not effect virtually complete separation of liquid and vapor; that is, throughout the confines of the device, liquid and vapor are in constant contact with each other.

U.S. Pat. No. 3,146,189 (Cl. 208-146), issued Aug. 25, 1964, involves a device for the initial distribution of a vapor/liquid feed stream to a fixed-bed of catalyst particles. The liquid and vaporous components are separately introduced into the catalyst bed through a horizontal plate containing liquid downcomers and vapor downcomers, the latter extending into the bed of catalyst particles and designed to afford lateral vapor flow therethrough. Separation of the mixed-phase is effected in the void space between the inlet conduit and nozzle (30 and 31), and the horizontal plate (17). Liquid collects on the plate to a level which is determined by the height of a plurality of cylindrical weirs (18); overflowing liquid is trickled downwardly into the catalyst particles through an orifice (19) in the bottom of each weir. Vapors are prevented from entering the weirs by virtue of the created liquid seal. These are caused to flow through the upper periphery of downcomers (20), downwardly therethrough and finally laterally through screening means (27) laterally into the catalyst bed. The vapor downcomers are adapted with an imperforate top plate (25) to prevent liquid from entering therein.

Although the reference recognizes the disadvantages of vapor/liquid channelling, and provides a device for alleviating the same where the reactant stream initially contacts the catalyst bed, there is neither recognition of, nor provision made with respect to channelling which occurs throughout the remainder of the catalyst particles. In short, there is no re-mixing for the creation of froth and re-distribution of the same; further, the device is incapable of so doing.

U.S. Pat. No. 3,378,349 (Cl. 23-288), issued Apr. 16, 1968, directs itself to an inner-reactor mixed-phase distribution apparatus, the principal function of which serves to thoroughly admix the reactant stream effluent with a quench stream introduced between catalyst zones (Column 1, Lines 23-37 and Column 8, Lines 17-41). Whether gaseous, or liquid quench, the device is designed for the same to be introduced directly into the mixed-phase effluent emanating from the preceding, upper bed of catalyst particles.

In contrast to the mixed-phase distributor herein described, there exists no separation of the reactant stream effluent into the individual liquid and vaporous phases. This is evident, not only from the construction of the apparatus (particularly as shown in FIG. 1), but also in the description of the manner in which the device functions; the latter is found in Column 5, Lines 1-21 and in Column 7, Lines 19-42. As indicated, both liquid and vapor constituents flow through the same downcomers immediately following disengagement from the previous bed of catalyst particles. Furthermore, there exists no creation of an intimate froth of vapor and liquid for re-distribution into the succeeding bed of catalyst particles.

Still another mixed-phase distributing device is the subject of U.S. Pat. No. 3,524,731 (Cl. 23-288), issued Aug. 18, 1970. The device is intended to ease the ill effects resulting from maldistribution (channelling) of the mixed-phase components (Column 1, Line 65 through Column 2, Line 15). Essentially, the distributing apparatus consists of a horizontal plate having inserted therein and therethrough a plurality of short tubes and a plurality of longer tubes which are notched proximate to the terminus above the horizontal plate. Functioning of the distribution device is generally described in Column 2, Lines 26-49 and in Column 4, Lines 22-46; a perusal thereof indicates that the device functions differently with high and low liquid flow rates. In the former situation, only liquid flows downwardly through the shorter tubes, while both liquid and vapor flow through the longer tubes.

Although there could be considered a separation of liquid and vapor components, only, however, in the situation of low liquid flow rates, there is no separation and re-mixing in such a manner as to create an intimate froth for re-distribution into the next succeeding bed of catalyst particles. The froth is not created merely by virtue of the fact that liquid components are flowing downwardly through tubes other than those through which the vaporous material is passed.

A flow distributor system somewhat similar to that illustrated in U.S. Pat. No. 3,146,189, hereinabove described, is the subject of U.S. Pat. No. 3,685,971 (Cl. 23-288), issued Aug. 22, 1972. The distributor is located proximate to the reactant stream inlet port and is contiguous with the inlet conduit. Its discharge end consists of a plurality of depending, spaced-apart concentric frusto-conical baffle members which produce an outward deflection of concentric, annular-form flow streams to an equivalent proportional area of the lower catalyst bed. As previously stated, there is recognition of channelling at the initial portion of the catalyst bed, and the device is intended to eliminate the same by providing uniform distribution of the mixed-phase feed stream. There is no separation, re-mixing and re-distribution of the vapor and liquid within some intermediate portion of the catalyst bed.

U.S. Pat. Nos. 3,652,450 (Cl. 208-146), issued Mar. 28, 1972, 3,697,416 (Cl. 208-146), issued Oct. 10, 1972 and 3,723,300 (Cl. 208-146), issued Mar. 27, 1973, all involve techniques for the introduction of quench streams into intermediate loci of fixed-bed catalytic reaction zones and the various devices suitable for assuring proper, uniform mixing thereof with the mixed-phase reactant stream.

The foregoing delineated references, copies of which accompany this application, are all directed toward mixed-phase catalytic processing and the uniform distribution of the reactant stream; therefore, they are appropriate to the subject matter of the present application. However, it is believed that, whether taken singly, or in combination with each other, they neither anticipate, nor render obvious the technique and apparatus encompassed by the invention claimed and described herein. In summation, there exists no teachings and/or recognition of virtually complete separation of the mixed-phase reactant stream, a re-mixing thereof to create a vapor/liquid froth and the re-distribution of the froth to a lower, succeeding bed of catalyst particles.

SUMMARY OF THE INVENTION

Distribution of a mixed-phase vapor/liquid reactant stream to a fixed-bed of catalyst particles, in accordance with the invention herein described and claimed, is founded upon recognition of the fact that provisions have not heretofore been afforded which will alleviate vapor/liquid segregation with resultant channelling as the reactant stream introduced across the upper surface of the catalyst bed traverses the same. At best, the devices and techniques previously developed, and perhaps currently in use, do nothing more than distribute a multiplicity of small portions of the mixed-phase reactant stream onto a like number of small areas of catalyst particles situated atop the confined bed thereof. As a result, each small portion virtually immediately commences to segregate into distinct vapor and liquid streams which combine with other smaller vapor and liquid streams to seek channelled paths through the remainder of the catalyst particles. Similarly, the use of either vaporous, or liquid quench streams, or both, to attenuate the temperature rise experienced with exothermic reactions, has been recognized as a judicious operational technique. Many methods and devices have been proposed, virtually all of which inject a multiplicity of smaller quench portions intermediate the catalyst bed; however, the effect is the same as above noted. That is, these smaller portions seek to combine with each other to produce larger segregated portions which commence to channel through the bed. Through the practice of the present technique, and the use of the device encompassed by my invention, the mixed-phase vapor/liquid reactant stream is introduced into the fixed-bed of catalyst particles in a form which resists segregation, accompanied by channelling, as the reactant stream traverses the catalyst bed.

The mixed-phase reactant stream is generally introduced into an upper void volume within the reaction chamber, and passes through a perforated horizontal plate under which is disposed the upper surface of the bed of catalyst particles; a similar perforated plate functions as catalyst support means at the lower extremity of the catalyst bed. Where a reaction chamber contains more than one bed of catalyst particles, each is usually defined by such upper and lower perforated horizontal plates. The vapor/liquid distributor may be installed either in the uppermost void volume above the first bed of catalyst particles, or between the two perforated horizontal plates which separate one catalyst bed from another. In many situations, it will be advantageous to install the distributor device in both locations. Where the exothermicity of the reactions indicates an expected temperature rise beyond the maximum allowable for protection of the catalyst particles, a quench stream is introduced intermediate the catalyst beds. The present device facilitates the uniform, thorough distribution thereof, whether vaporous, or liquid, and also affords uniform quenching of the reactant stream, thereby avoiding localized hot spots.

Distribution of the vapor/liquid reactant stream, as described herein, involves three distinct steps, each of which is effected in separate, individual zone of the apparatus. The mixed-phase, for discussion and illustration purposes being presumed to be the effluent from an upper, preceding bed of catalyst particles, passes through the perforated catalyst support plate into a vapor/liquid separation zone. Through the utilization of a plurality of separated cylindrical walls, all of which are in concentric relationship with the interior surface of the reaction chamber, the mixed-phase is separated into an upwardly-flowing, substantially liquid-free vapor-phase and a downwardly-flowing, substantially vapor-free liquid-phase. Liquid constituents initially passing through the perforated catalyst-support plate are prevented from becoming admixed with the separated vapor-phase by an imperforate horizontal washer-shaped disc which is disposed above the annular-form volume through which vapor is flowing. All the elements of the vapor/liquid distributor are hereinafter more thoroughly and completely described with reference to the accompanying drawings.

The flow of the liquid phase is reversed upwardly and a quasi-stagnant pool thereof is formed by overflowing a cylindrical wall, or weir onto a horizontal, perforated plate. Vapor-phase flow is also reversed, to assume a downward direction into a catalyst-free area (or volume) below the quasi-stagnant liquid pool. The vapors pass upwardly through the perforations, and into and through the quasi-stagnant liquid pool. This area of the device is herein referred to as the re-mixing zone wherein the vapor velocity upwardly into the pool of liquid is sufficiently high to prevent excessive liquid flow downwardly through the perforations and, more importantly, to create the vapor/liquid froth. Where a vapor quench stream is utilized, it is introduced into the separated vapor-phase proximate to the locus of vapor flow reversal. This is accomplished through the use of a toroidal ring having perforations which direct the quench vapors downwardly. Similarly, liquid quench is introduced through perforations in a toroidal ring disposed proximate to the locus of liquid flow reversal. Quench streams may consist of reactant stream components where appropriate. The term "quasi-stagnant" is used with reference to the liquid pool since it is almost immediately formed into the froth by the high velocity vapors.

The froth is directed through a plurality of downcomers which originate in a horizontal plate disposed below the perforated plate through which the vapors pass upwardly. These downcomers extend upwardly through the perforated plate and terminate in the re-mixing zone below the plane containing the upper periphery of the cylindrical weir. Downwardly-flowing froth passes into a catalyst-free area above the horizontal plate disposed immediately above the bed of catalyst particles, and is uniformly distributed through the apertures therein.

The vapor/liquid distribution apparatus encompassed by my inventive concept, and intended for utilization in fixed-bed catalyst reaction zones, will be further described and more fully understood upon reference to the accompanying drawings. Since these are presented for the sole purpose of illustration and to foster a complete understanding of the device and the techniques involved, they are not considered as having been drawn to an accurate scale. For any given application, the precise construction of the illustrated apparatus will be primarily dependent upon the reaction zone dimensions, the volume of catalyst disposed therein and the relative quantities of vapor and liquid which are introduced and traverse the entire catalyst bed.

BRIEF DESCRIPTION OF DRAWINGS

The various elements constituting the present vapor/liquid distributing apparatus are shown in the drawings as being substantially circular in cross-section, in contrast to cross-sections which would be chordal in the various sectioned plan views. As hereinbefore stated, the device can be constructed so that sectioned plan views would illustrate a combination of circular and chordal cross-sections. The former are generally preferred from the standpoint of providing maximum internal reaction zone volumes in which to achieve the desired and intended functions.

With brief reference to the drawings.

FIG. 3 is a partially-sectioned plan view taken downwardly substantially along the line 3—3 of FIG. 1. Liquid quench inlet port 6 is in open communication with a second toroidal ring having a plurality of inwardly facing apertures 7a.

As shown in FIGS. 3 and 4, downcomers 22 are radially disposed, and in circumferential relationship with each other. The apertures and horizontal plates 10, 12, 20a and 24 are also radially disposed and in circumferential relation.

In FIG. 5, the "grid" containing downcomers 22 and apertures 21 is square in its configuration. In contrast, FIG. 6 illustrates a "grid" which is essentially triangular in configuration.

DETAILED DESCRIPTION OF DRAWINGS

Figure 1:
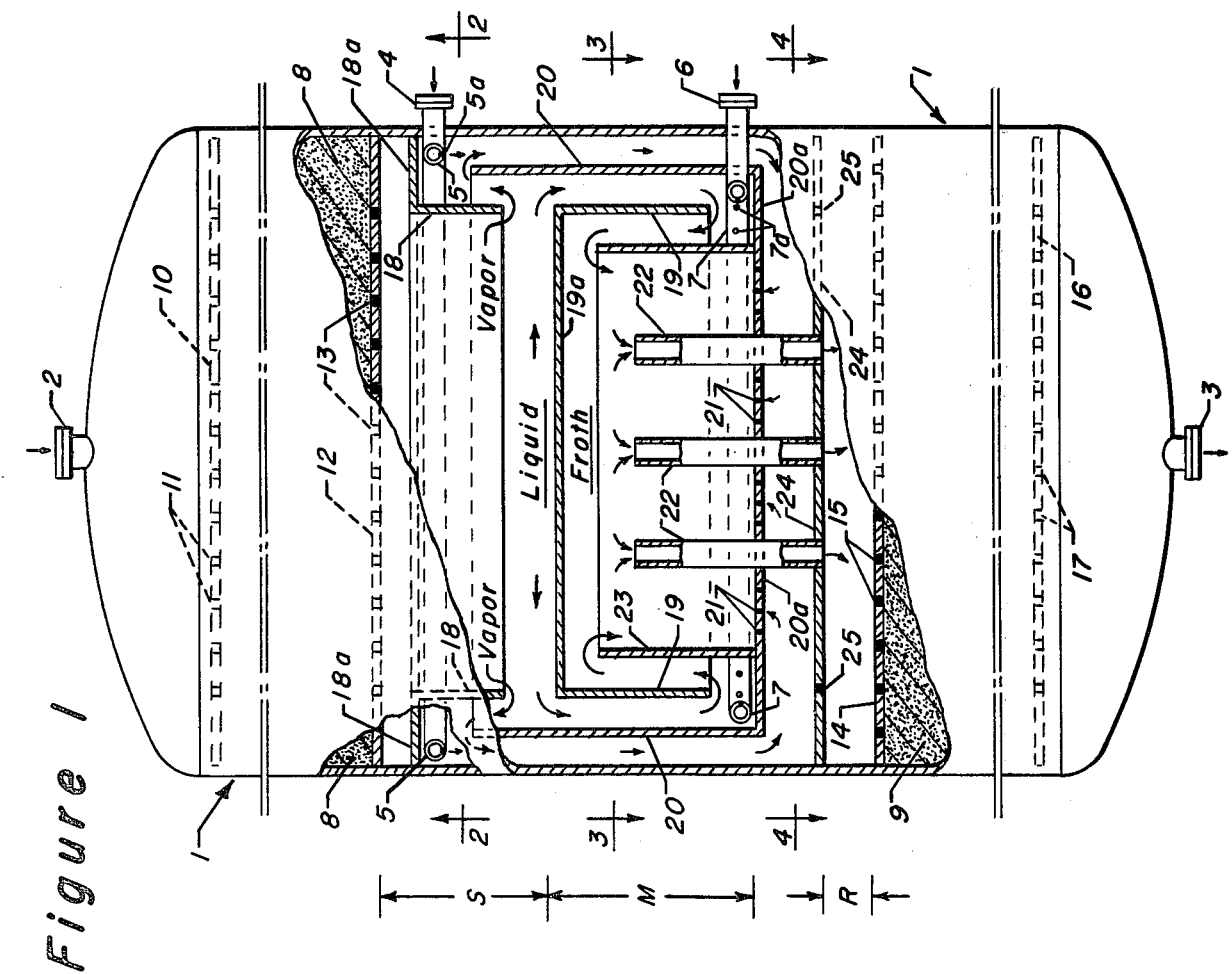
FIG. 1 is a partially-sectioned elevation of a fixed-bed catalytic reaction zone, generally indicated by numeral 1, and having a reactant stream inlet port and conduit 2 and a product effluent outlet port and conduit 3. When the reactions are principally exothermic in nature, thereby producing a temperature rise as the reactant stream traverses the catalyst bed, the reaction zone is adapted with a vapor quench inlet port 4 and/or a liquid quench inlet port 6. The use of such quench streams, for the purpose of attenuating the temperature rise experienced with exothermic reactions is well known to those having the requisite skill in the petrochemical and petroleum refining arts. In this illustration, the present apparatus is shown as being disposed between an upper catalyst bed 8 and a lower catalyst bed 9.

With specific reference now to FIG. 1, catalytic reaction zone 1 is shown as having two individual beds of catalyst particles 8 and 9; these are separated by the vapor/liquid distribution device which constitutes my invention. Essentially, the distributor has three separate zones each of which performs a distinct function. Separation zone "S", between perforated, catalyst-support plate 12 and imperforate horizontal plate 19a, serves to separate vapor from liquid in the mixture emanating from catalyst bed 8. Mixing zone "M", extending downwardly from imperforate horizontal plate 19a to the perforated horizontal plate 20a, effects the intimate remixing of the previously separated vapors and liquid, thereby creating a froth. The froth is re-distributed to lower catalyst bed 9 from re-distribution zone "R", being the void space between horizontal plate 24 and perforated plate 14, the latter disposed atop catalyst bed 9.

The mixed-phase reactant stream, following the required degree of pre-heat to achieve reaction zone temperature, is introduced into catalytic reaction zone 1 by way of inlet port and conduit 2. Perforated horizontal plate 10, containing perforations or apertures 11, defines the upper extremity of catalyst bed 8, and serves to initially distribute the reactant stream throughout the catalyst particles. The appropriate art is replete with examples of devices to effect the initial distribution of a reactant stream (existing in mixed-phase) to a catalytic reaction zone; one such device is the subject of U.S. Pat. No. 3,685,971 (Cl. 23-288R), hereinbefore discussed. The use of such a device is neither essential to, nor a part of the device encompassed by my inventive concept. However, the vapor/liquid distributor herein described may be installed in reaction chamber 1 in the area above horizontal plate 10 in order to effect initial distribution of the reactant stream to catalyst bed 8. The reactant stream traverses catalyst bed 8 and emanates therefrom through perforated, horizontal catalyst-support plate 12; apertures 13 are obviously sized to inhibit the passage of catalyst particles therethrough.

Reaction product effluent from catalyst bed 8 enters the separation zone "S" of the present vapor/liquid distributor through apertures 13; since the majority of mixed-phase operations involve reactions which are primarily exothermic in nature, the temperature of the reactant stream rises as catalyst bed 8 is traversed. A common practice is to quench this stream to lower its temperature before it continues through the remainder of the catalyst disposed within the reaction zone. In accordance with the present illustration, a vaporous quench inlet port 4 is provided; this is in open communication with a toroidal ring 5 having apertures (see FIG. 2) disposed throughout its circumference to direct the vaporous quench in a downwardly direction. An imperforate horizontal washer-shaped disc 18a is disposed above toroidal ring 5 to prevent the flow of liquid reactant stream constituents into the annular-form volume through which separated vapors are flowing downwardly. Washer-shaped disc 18a is attached, at its outer periphery, to the interior surface of reaction chamber 1, and extends inwardly to also cover an intermediate annular-form volume formed between cylindrical wall 20 and cylindrical wall 19. Preferably, the minor (inside) circumference of disc 18a is adapted with a downwardly extending cylindrical wall 18. The latter terminates below the upper peripheral edge of cylindrical wall 20.

Vaporous reactant stream effluent from catalyst bed 8 is caused to flow upwardly through the annular-form volume between cylindrical wall 20 and cylindrical wall 18. The upper edge of the former extends to a plane above that which contains the lower edge of the latter in order to prevent liquid effluent from entering the annular-form volume created with the interior surface of the reaction zone. Vaporous effluent is admixed with the quench vapors from toroidal ring 5, and passed downwardly through the annular-form downcomer formed between the interior surface of the reaction chamber and the cylindrical wall 20. These vapors flow, substantially free from liquid constituents, horizontally into the void volume between lower horizontal plate 24 and the upper, perforated horizontal plate 20a which is attached to the entire lower periphery of cylindrical wall 20.

Liquid components in the effluent from catalyst bed 8 flow outwardly toward the interior surface of catalytic reaction zone 1 by virtue of imperforate horizontal top plate 19a which is attached to cylindrical wall of inverted U-shaped baffle 19; the latter forms a second, intermediate annular-form space with cylindrical wall 20. Liquid flows downwardly through the annular-form volume and is admixed therein with the quench liquid from toroidal ring 7; the latter has apertures disposed along its circumferential surface which direct the quench inwardly toward cylindrical weir 23. The mixture, substantially free from vapor, flows upwardly through a third annular-form volume between cylindrical wall 19 and circular weir 23, creating a liquid "seal" that restricts the passage of vapor therethrough. A froth of vapors and liquid is created in mixing zone "M" as the liquid constituents which overflow cylindrical weir 23 are intimately contacted with the vapors flowing upwardly through apertures 21 in horizontal plate 20a. The froth flows through a plurality of downcomers 22 into re-distribution zone "R", and therefrom through apertures 15 disposed in horizontal plate 14 and into catalyst bed 9. Downcomers 22 are disposed in a manner which effects uniform distribution of the froth into the lower catalyst bed. Product effluent from catalyst bed 9 flows through apertures 17 disposed in catalyst-support plate 16, and are withdrawn from catalytic reaction zone 1 through outlet conduit and port 3.

Figure 2:
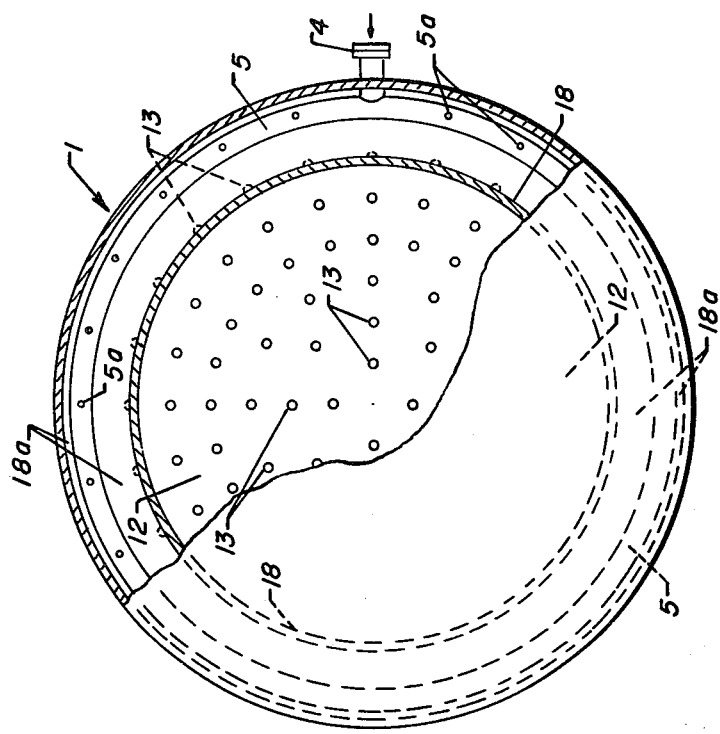
FIG. 2 is a partially-sectioned plan view taken upwardly substantially along the line 2—2 of FIG. 1. Vapor quench inlet port 4 is shown as communicating with a toroidal ring 5, having a plurality of downwardly-directed apertures 5a; this construction is preferred since it enhances the uniform distribution of the vaporous quench stream.
Figure 4:
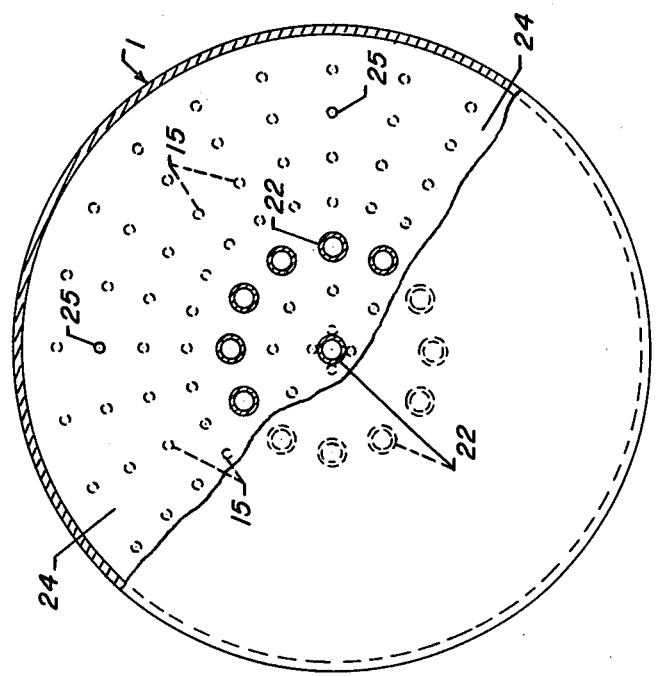
FIG. 4 is a partially-sectioned plan view taken downwardly substantially along the line 4—4 of FIG. 1. Indicated are a plurality (in this illustration 4) of weep holes 25 which are employed to prevent minor quantities of entrained liquid from accumulating on tray 24. It will be noted from FIGS. 2, 3 and 4, that all the components of the illustrated vapor/liquid distribution device are circular in cross-section and coaxially-disposed within the catalytic reaction chamber.
Figure 3:
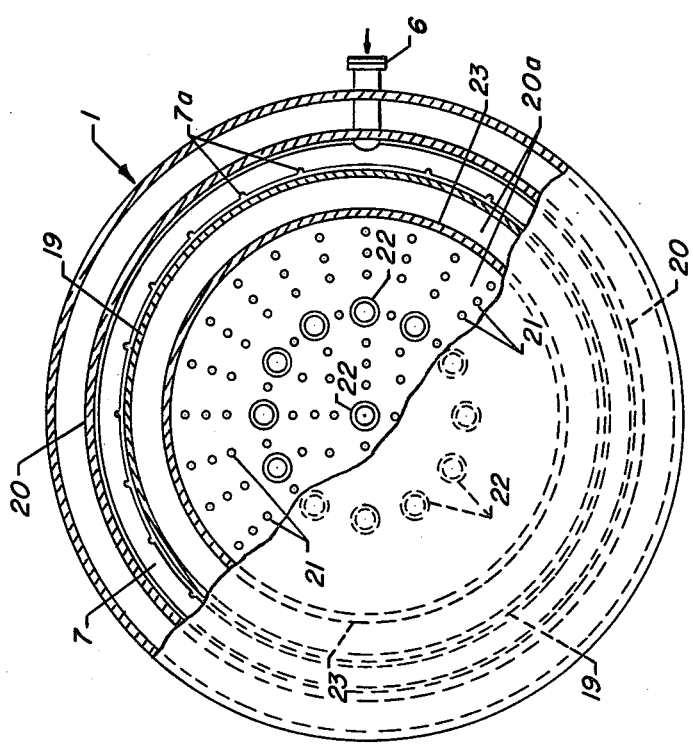

FIG. 2, the partially-sectioned plan view taken upwardly substantially along the line 2—2 of FIG. 1, is presented for the principal purpose of illustrating the relationship of toroidal ring 5, having downwardly directing apertures 5a circumferentially disposed therein, and washer-shaped disc 18a, adapted with cylindrical wall 18. Similarly, FIG. 3, the partially-sectioned plan view taken downwardly substantially along the line 3—3 of FIG. 1, illustrates the relationship of toroidal ring 7, having inwardly-directing apertures 7a circumferentially disposed therein, and circular weir 23. Also, the relationship of froth downcomers 22, which extend through the horizontal plate 20a, and the apertures 21 which are radially and circumferentially disposed therein. FIG. 4, being the partially-sectioned plan view taken substantially along the line 4—4 of FIG. 1, is intended to show the liquid weep holes 25 (solid lines) which are circumferentially disposed in horizontal plate 24.

Figure 5:
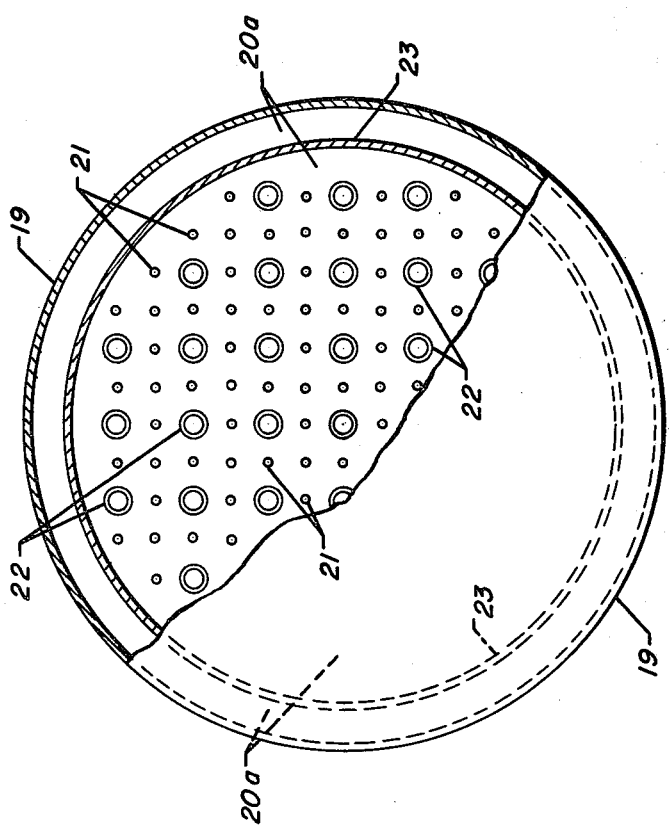
FIGS. 5 and 6 are similar to FIG. 3; however, they illustrate modifications to the layout of downcomers 22 and apertures 21 within the confines of circular weir 23.
Figure 6:
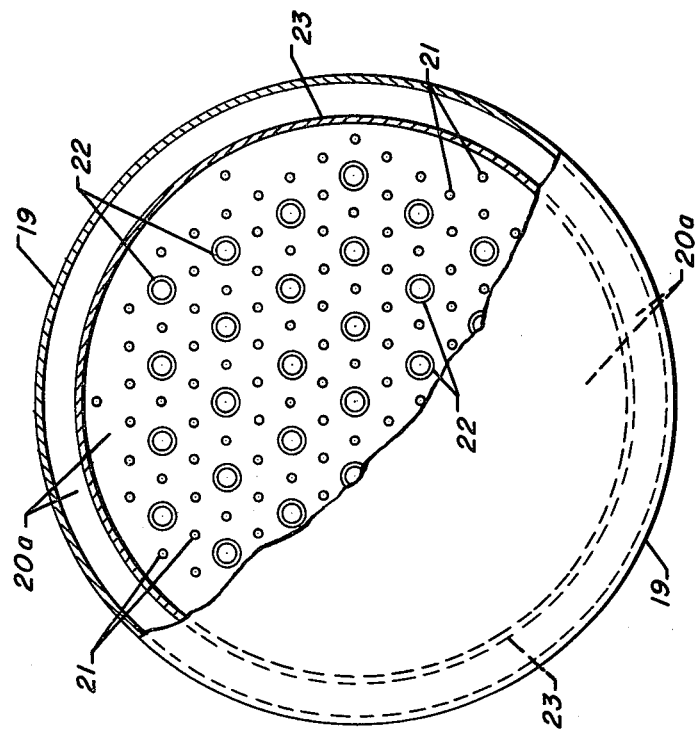

As previously set forth, FIGS. 5 and 6 are partially-sectioned plan views presented to illustrate the layout of froth downcomers 22 and apertures 21 in squared and triangular "grids", respectively. Although a wide variety of tube spacings may be utilized, not necessarily with equivalent results, the present apparatus will utilize grid arrays which are circumferential (FIGS 3 and 4), square (FIG. 5) and triangular (FIG. 6); grids of the square and triangular configurations are particularly preferred.

It will be noted that the distribution device encompassed by my inventive concept permits the virtually complete separation of vaporous and liquid phases; this affords the re-mixing to create an intimate vapor/liquid froth much the same as that found in fractionation columns by the upward flow of vapors through a liquid phase. The device also affords quenching with vapor and/or liquid prior to the creation of the froth in order to quench the mixture uniformly. Other benefits and advantages will become apparent to those possessing the requisite skill in the appropriate art.

I claim as my invention:

1. In a cocurrent, mixed-phase catalytic reaction system wherein a vapor/liquid reactant stream flows downwardly through a fixed-bed of catalyst particles, the method for effecting the uniform distribution of said reactant stream which comprises the sequential steps of:
   (a) introducing said vapor/liquid reactant stream into a first catalyst-free area within said reaction system, and therein separating said stream into (i) an upwardly-flowing, substantially liquid-free vapor phase and, (ii) a downwardly-flowing, substantially vapor-free liquid phase;
   (b) reversing the flow of said separated liquid phase and forming a quasi-stagnant pool thereof;
   (c) reversing the flow of the separated vapor phase and introducing said vapor phase into a lower second catalyst-free area, within said reaction system, disposed below said quasi-stagnant liquid pool;
   (d) passing said vapor phase upwardly through said liquid pool at sufficient velocity to create a vapor/liquid froth therewith; and,
   (e) distributing said vapor/liquid froth downwardly into a bed of catalyst particles, disposed below said quasi-stagnant liquid pool, across substantially the entire upper surface thereof.

2. The method of claim 1 further characterized in that the mixed-phase reactant stream is passed into said first catalyst-free area when it is initially introduced into said catalytic reaction system.

3. The method of claim 1 further characterized in that the mixed-phase reactant stream introduced into the first catalyst-free area is the mixed-phase effluent from an upper, preceding fixed-bed of catalyst particles.

4. The method of claim 1 further characterized in that a vapor-phase quench stream is admixed with said separated vapor-phase at the locus within said first catalyst-free area where the flow of the separated vapor-phase is reversed.

5. The method of claim 1 further characterized in that a liquid-phase quench stream is admixed with said separated liquid phase at the locus within said first catalyst-free area where the flow of the separated liquid phase is reversed.

* * * * *